March 17, 1953 — W. R. ROOP — 2,631,566
MILKING MACHINERY
Filed June 29, 1950 — 3 Sheets-Sheet 1
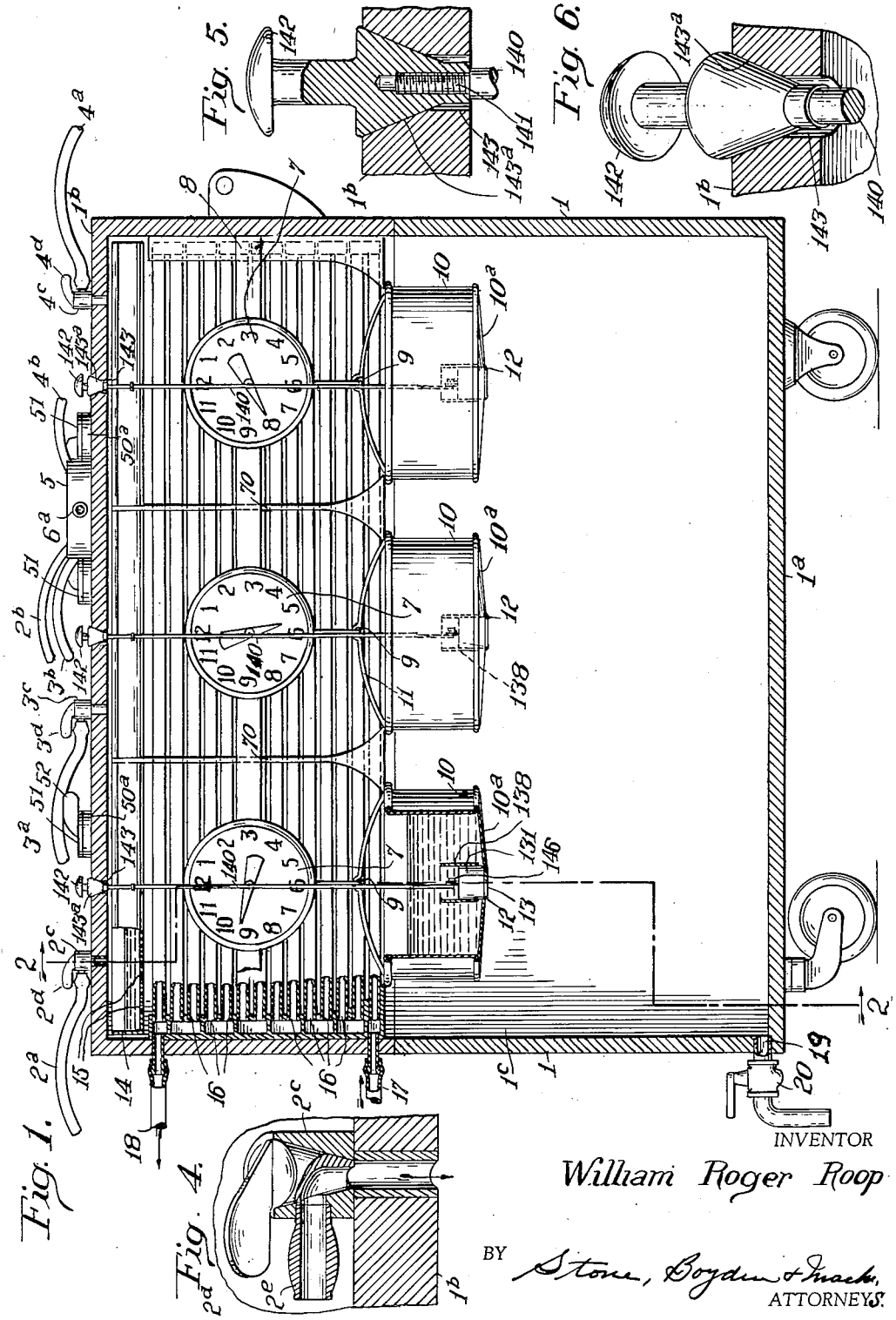
INVENTOR
William Roger Roop
BY Stone, Boyden & Mack,
ATTORNEYS March 17, 1953 W. R. ROOP 2,631,566
MILKING MACHINERY
Filed June 29, 1950 3 Sheets-Sheet 2
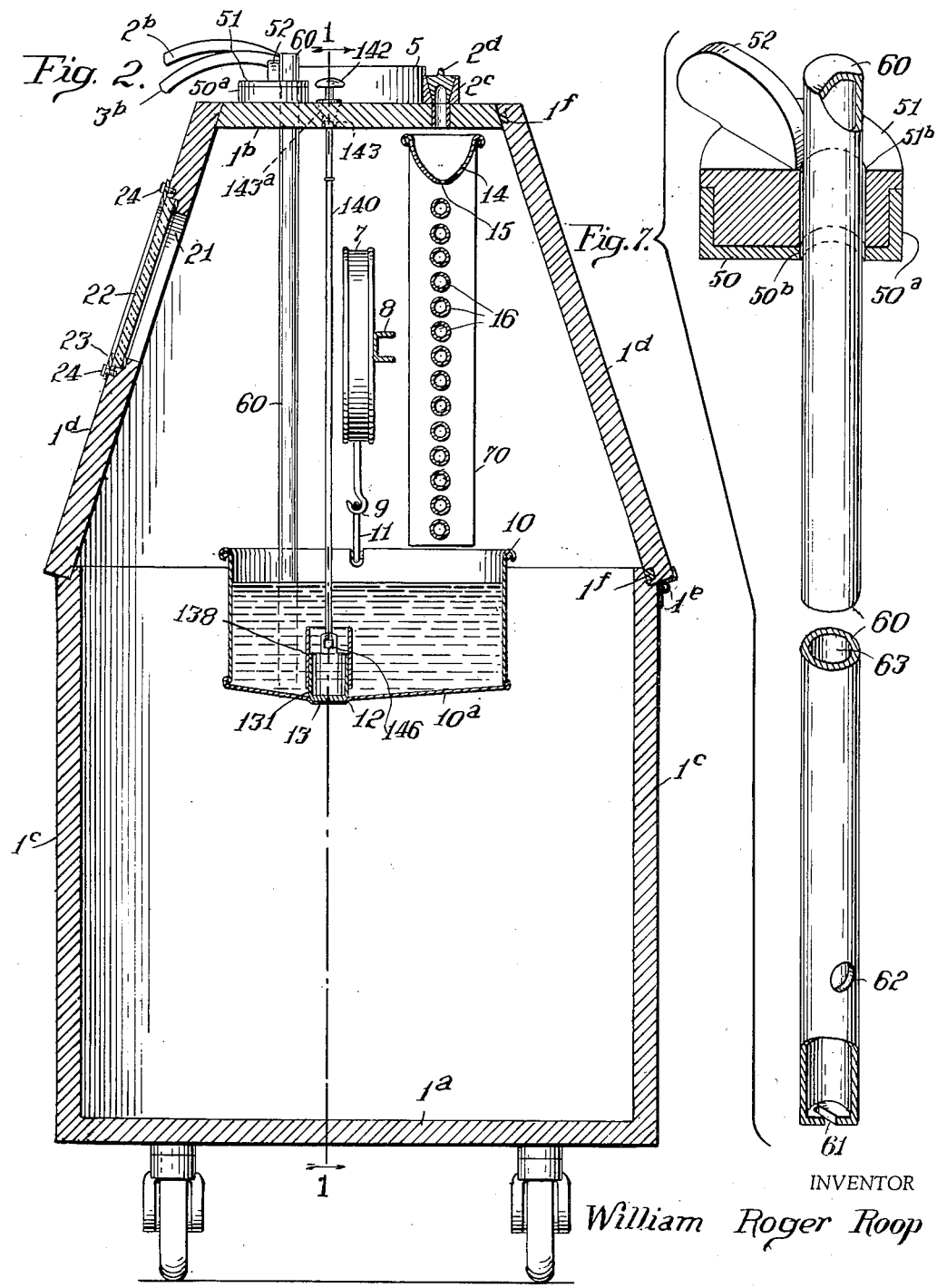
INVENTOR
William Roger Roop
BY Stone, Boyden & Mack
ATTORNEYS March 17, 1953
W. R. ROOP
2,631,566
MILKING MACHINERY
Filed June 29, 1950
3 Sheets-Sheet 3
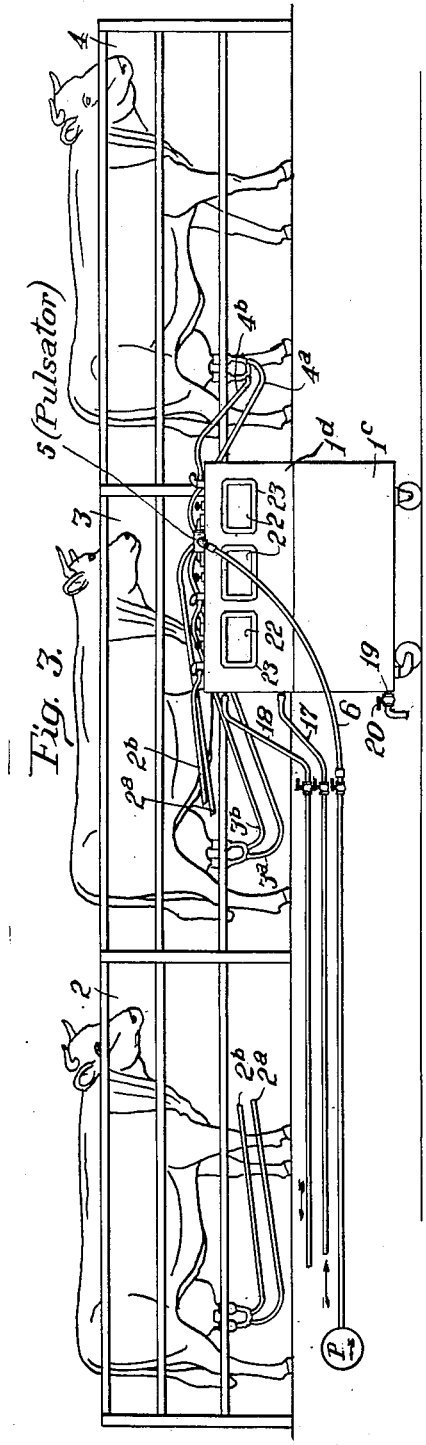
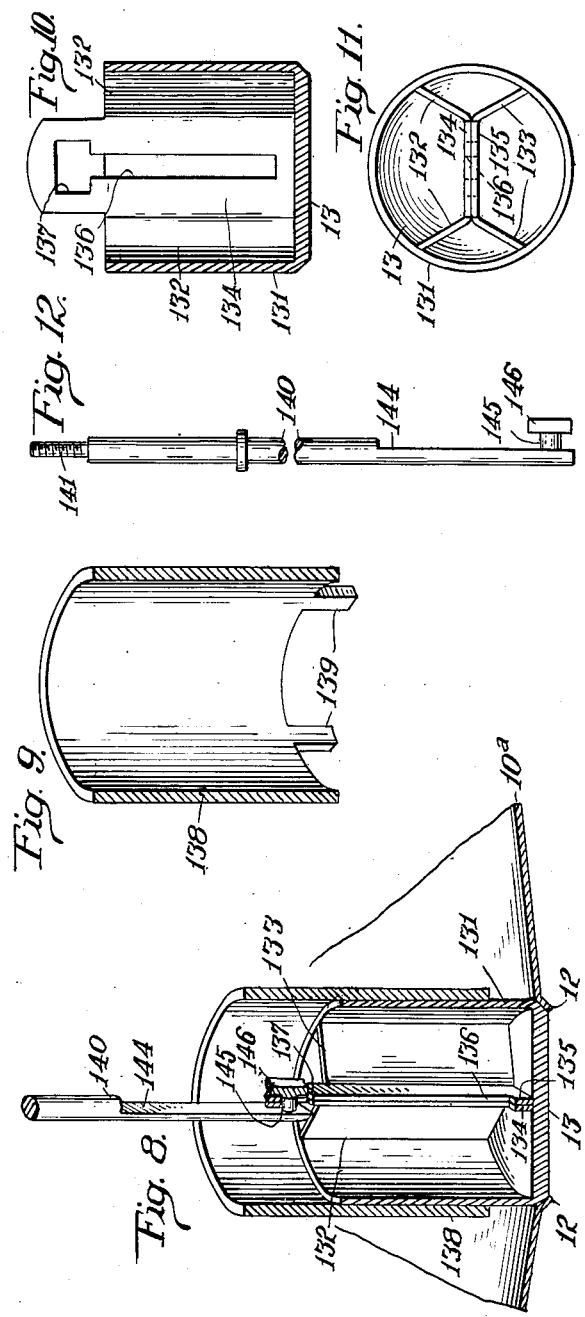
INVENTOR
William Roger Roop
BY Stone, Boyden & Mack,
ATTORNEYS Patented Mar. 17, 1953

2,631,566

UNITED STATES PATENT OFFICE 2,631,566

MILKING MACHINERY

William Roger Roop, Keymar, Md.

Application June 29, 1950, Serial No. 171,047

7 Claims. (Cl. 119—14.09)

This invention relates to machinery for sampling milk. More particularly it pertains to a milk sampling machine by means of which the milk production of a certain cow or several cows may be separately tested for quantity, quality, and for cream content.

This milk handling device serves to efficiently perform and simplify at least four operations in the processing of milk at the dairy farm. Among the improved steps in handling made possible by this improved milk handling apparatus are cooling, weighing, sampling and storing, all of which steps are used during the milking period and without slowing up, postponing or otherwise rendering more complicated the procedure of handling milk immediately following the milking operation per se.

The mechanism, apparatus, and associated devices for conducting the foregoing steps are rendered effective by means of a simple, compact cabinet which is preferably portable and the interior of which is maintained at sub-atmospheric pressure, whereby the milking machine is provided with adequate suction and the flow of milk to the point of testing within the cabinet is constantly under vacuum.

The cabinet is so designed that it will handle the milk from one cow or a plurality of cows simultaneously and individually. The normal functioning of the cabinet provides for the following procedure. As the milk enters the top of the cabinet, it flows into a distributing pan which permits it to flow downwardly over a surface cooler into a bucket or pail which is suspended from a weighing scale. The refrigerating fluid, cold water, for example, is pumped through the cooler, thereby cooling the milk within a few seconds after it has been milked from the cow. The distributing pan, the cooler, and the weighing scale enter into the operating combination of parts, all of which are preferably located within the air tight cabinet. A glazed inspection window and interior illumination make it possible to observe the flow of milk and read the scale without exposure of the milk to milking parlor atmosphere.

Among the advantages inherent to this machinery for handling milk, it will be noted that the milk from a certain cow is weighed and collected in a certain bucket. It will also be obvious that one of these improved cabinets may be designed to contain any number of scales and buckets. A satisfactory operating size provides for three units within each cabinet, thus serving to handle individually the milk from three cows. The milk from several cows is maintained separate until approved. Thus, if the milk of any one cow is found to be discolored or otherwise of a condition rendering it unfit for use, operation of the machine can be stopped temporarily; the cabinet opened and that pail of milk which is unfit can be removed without contaminating the milk from the other two cows.

One feature of the apparatus of this invention includes the arrangement by which the milk which has been weighed in a bucket can be released from that bucket to the lower portion of the interior of the cabinet from which it can be drawn off as desired. The control for the release of the milk from the buckets or pails is designed to be manipulated from the exterior of the cabinet.

As a matter of convenience, the cabinet being portable and preferably mounted on wheels, it may be rolled to a suitable delivery point where the milk from the cabinet may be drawn out by gravity into shipping cans.

The above mentioned features of operation, advantages, and details of construction will become clear from the following specification and claims and from the accompanying drawings, in which:

Fig. 1 is a vertical sectional view through the portable cabinet of this invention and taken on the line 1—1 of Fig. 2;

Fig. 2 is a vertical transverse section taken on the line 2—2 of Fig. 1 looking in the direction of the arrow;

Fig. 3 is a view illustrating the relative relation between the portable cabinet of this invention and a dairy arrangement having three milking parlors or stalls each equipped with milking attachments, and illustrating the connections between the milking device per se and the portable cabinet of this invention;

Fig. 4 is an enlarged partial sectional view vertically through the connection for the introduction of milk into the cabinet, showing the hand controlled valve for opening or closing that intake line;

Fig. 5 is an enlarged vertical sectional view through the handle and the upper end of the rod for manipulating the valve at the bottom of a measuring pair or bucket;

Fig. 6 is a perspective view of the same valve shown in Fig. 5 from below;

Fig. 7 is an enlarged vertical sectional view of a valve in the top of the cabinet through which a sampling device may be introduced downwardly, showing such a sampling device in its inserted position;

Fig. 8 is an enlarged vertical sectional view taken through one of the valves within a bucket, illustrating the position of the valve when seated on the floor of the bucket;

Fig. 9 is a fragmentary view showing the valve cylinder as shown in Fig. 8 but with the valve removed;

Fig. 10 is a vertical section through one of the valves looking substantially at right angles to the valve shown in Fig. 8;

Fig. 11 is a top plan view of the valve per se, as shown in Fig. 10; and

Fig. 12 is a vertical elevation of the valve actuating rod, the lower end of which is shown at the top of Fig. 8.

Referring in detail to the drawings, in Fig. 3 there is illustrated one of the cabinets of this invention showing the connections between a cabinet and each of three milking devices for use on three cows. Fig. 1 illustrates a vertical central section taken lengthwise through such a cabinet as is shown in Fig. 3. This view is taken on the line 1—1 of Fig. 2. Fig. 2 is a vertical transverse section through the cabinet taken on the line 2—2 of Fig. 1.

Still referring to the cabinet as a whole, and more especially with reference to Figs. 1 and 2, it will be noted that the cabinet has vertical end walls at 1, a bottom or floor 1ª, and a top or roof portion 1ᵇ. The side walls from the floor upward for about one-half the height of the cabinet are vertical, as indicated at 1ᶜ and from the upper ends of the side walls 1ᶜ, the side walls are sloped inwardly and upwardly, as indicated at 1ᵈ. At least one of the walls 1ᵈ is provided with hinges 1ᵉ, whereby the wall 1ᵈ may be swung outwardly and downwardly for convenient access to the interior of the cabinet. Gaskets 1ᶠ of rubber or other suitable compressible material are provided around the periphery of the hinged door 1ᵈ adjacent its marginal edge and adapted to bear against the adjacent upper edge portion of the wall 1ᶜ, the adjacent edge portion of the top 1ᵇ and the adjacent edges of the end walls 1, the latter end walls not being illustrated.

The function of the gasket element 1ᶠ is to insure an airtight fitting between the door 1ᵈ and the foregoing mentioned walls whereby sub-atmospheric pressure within the cabinet may be maintained, as will be described.

As shown in Fig. 2, the other wall 1ᵈ is provided with a window opening 21 covered by an inspection glass 22 and the latter is clamped in place by means of a plate 23 secured by suitable screws 24. The mounting of the inspection glass must be hermetically sealed, so as to thus insure adequate control of sub-atmospheric pressure within the cabinet.

Referring to Fig. 3, which illustrates three milking parlors 2, 3 and 4 respectively, it will be observed that from section 2 thereof, the tubes or pipes leading from the milking device itself are indicated at 2ª and 2ᵇ. Those same pipes lead to the cabinet as will now be described. Similar pipes leading from sections 3 and 4 of the milking parlor are indicated at 3ª and 3ᵇ and 4ª and 4ᵇ respectively.

The connections from the respective milking machines and sections 2, 3 and 4 with the cabinet of this invention include the following related structural details. On the upper wall or top of the cabinet is mounted a device here identified as a pulsator 5, the function of which is to provide the intermittent or pulsating action essential to effect proper milking. This pulsator 5 is connected to a vacuum pump by a suitable pipe or hose 6 which is connected to the pulsator 5 at a port 6ª (Figs. 1 and 2). Milk from the milking element at each cow passes through the pipes 2ª, 3ª and 4ª and is admitted into the cabinet through intake ports having intake valves 2ᶜ, 3ᶜ and 4ᶜ, each having control handles 2ᵈ, 3ᵈ and 4ᵈ respectively. The pipes 2ᵇ, 3ᵇ and 4ᵇ leading from the milking device at the cow lead directly to the pulsator 5 and it is through these pipes 2ᵇ, 3ᵇ and 4ᵇ that the pulsating influence is transmitted to the milking device. Each intake valve 2ᶜ, 3ᶜ and 4ᶜ is provided with a projecting tip over which may be slipped the end of the tube coming from the milking device, as shown at 2ᵉ in Fig. 4.

Means for weighing the milk from the respective cows and milking parlor sections is accomplished by means of weighing scales 7 mounted on a fixed frame element or beam 8 which is shown in Fig. 2 as a channel member extending lengthwise of the cabinet. This supporting element 8 has its ends secured to the end walls 1 by means not illustrated. Extending downwardly from the scale is a suitable work supporting hooked member 9 which is adapted to support a bucket 10. The bucket has a bail 11 which is normally in engagement with the hooked end of the work supporting member 9. In the position shown in Figs. 1 and 2, the bucket is thus in position to receive incoming milk to weigh it and to have other inspection made before the milk is released from the bucket, as will be described.

The bucket 10 has a bottom wall 10ª in which is located an outlet opening or discharge port having a marginal wall or valve seat 12 which is adapted to be closed by the lower end of a valve 13. Milk which has been weighed and tested while in the bucket is normally released from the bucket into the lower interior of the cabinet for ultimate withdrawal for shipping. The valve 13 is manipulated from a point above the cabinet by mechanism hereinafter to be described in detail.

The details of the valve 13 itself will be understood from the following. The valve closure portion 13 is in the shape of a cylinder having side walls 131 extending upwardly from the closure portion 13. Within the cylinder walls 131 is a double web member which is formed of two plates having matched central portions 134 and 135, the opposite ends of which respectively diverge diagonally with wing portions 132 and 133, as shown in plan view in Fig. 11 and in perspective view in Fig. 8. The central web portions 134 and 135 are provided with a common slot 136 extending vertically downwardly for a substantial portion of their height. In the upper end portion of the web parts 134 and 135 the slot 136 is enlarged as at 137. The slot 136 and the enlarged portion thereof 137 is adapted to receive the lower end of a valve actuating rod extending from above the top cover 1ᵇ of the cabinet, as will be described.

The valve element having the closure portion 13 and the cylindrical wall 131 is adapted to move vertically and slidably within a cylinder wall 138 which is fixed with respect to the bucket bottom 10ª. As shown in Fig. 9, the cylinder wall 138 is provided with feet 139, the lower ends of which are adapted to be secured to the upper inner surface of the bottom wall 10ᵃ of the bucket. The feet 139 serve to provide openings therebetween whereby milk from within the bucket may pass down through the valve opening 12 when the valve element 13 is lifted.

Control means for the valve 13 is provided by means of a valve rod 140, shown in Fig. 12. The upper end of this valve or rod 140 is provided with a threaded end 141 which is engaged with a handle element or knob 142, located at the upper surface of the cabinet. In the installation as shown in Figs. 1, 5 and 6, the upper wall 1ᵇ of the cabinet is provided with an opening vertically therethrough, as indicated at 143 and the knob or handle 142 is provided at its lower end with a tapered plug-like closure portion 143ᵃ which is adapted to be seated on a correspondingly tapered surface at the upper end portion of the opening 143. The engagement of the tapered wall 143 on its seat serves to provide a hermetically sealed closure, thus aiding in the maintenance of sub-atmospheric pressure within the cabinet except during such time as when the valve is opened to release milk from a pail 10.

At the lower end of the valve rod 140, the rod is preferably reduced in thickness. As shown in Figs. 8 and 12, the rod is provided with a flattened surface as at 144. This flattened surface is adapted to engage a face of the combined web portions 134 and 135. Substantially at the extreme lower end of the rod 140 is a laterally projecting stud 145, on the end of which is a collar or enlargement which is adapted to engage the opposite side of the web portions 134—135 from that face thereof engaged by the flattened surface 144 of the rod. In other words, the stud 145 is adapted to project through the combined thickness of the web portion 134—135 so that the enlarged end 146 may engage the opposite side and thus that the rotative movement of the rod may be directly reflected in the rotative movement of the web portion and thus control the rotative movement of the closure portion of the valve 13. In assembling the valve rod with the valve closure element 13 and its associated web portions 134—135 and slot elements 136 and 137, the valve is held so that the slot 136 is at right angles to the length of the rod 140. Thereupon the element 146 is thrust through the opening 137, after which the valve element is free to swing downwardly and the stud portion 145 is free to move vertically within the slot 136.

Combined cooling and distributing means for milk incoming through the intake valve 2ᶜ is provided by means of a trough element 14 which extends the length of the cabinet from end to end and a series of cooling elements having the tubes 16 beneath the trough element 14. In the lower portion of this trough element are distributing openings 15 through which milk may pass downwardly over a cooling element including a series of cooling tubes 16 arranged horizontally and lengthwise of the cabinet. The ends of the tubes are supported in a suitable frame mounted on the cabinet. A cooling medium, such as chilled water, is introduced through an intake pipe 17 to the lower members of the pipes 16 and is ultimately withdrawn through a discharge pipe 18.

Milk released from the respective pails or buckets 10 into the bottom of the cabinet may be withdrawn from the cabinet through a discharge pipe 19 having a suitable valve 20. The bottom of the cabinet is provided with wheels whereby the cabinet may be rolled to a convenient unloading point. The wheels at one end of the cabinet should be swivelled, after the manner of casters, to facilitate convenient turning and guiding of the cabinet.

Means for sampling the milk after it has been received in a bucket 10 is made possible by the use of a series of airtight valves located on the top 1ᵇ of the cabinet. These valves are shown at 50 in Figs. 1, 2 and 7. They preferably include a cup 50 which may be embedded in or rest securely upon the top surface 1ᵇ of the cabinet. Each cup has a bottom wall 50 and a cylindrically shaped side wall 50ᵃ. Through the lower wall of the cup 50 is an opening 50ᵇ through which access may be had to the interior of the cabinet. It will be understood that the top wall of the cabinet 1ᵇ must have an opening in alignment with the opening 50ᵇ. Seated in the cup 50 and extending downwardly into the space within the side wall 50ᵃ is a valve block 51 which is adapted to fit snugly within the side wall 50ᵃ. The valve block 51 is provided with an opening vertically therethrough as at 51ᵇ and which opening is adapted to be brought into registry with the opening 50ᵇ when a sample of the milk is to be taken from a pail. A handle 52 projects upwardly and outwardly from the upper surface of the valve block 51, whereby the valve block may be rotated within the wall 50ᵃ when it is desired to bring the openings 50ᵇ and 51ᵇ into registry with each other.

A conventional sampling device is shown in position in Figs. 2 and 7. It consists of an elongated tube 60 having its upper end closed and its lower end likewise closed except for a narrow slot, as indicated at 61. Slightly above the lower end of the tube 60 is a port 62 which extends through the side wall of the tube to provide communication to the interior of the tube 60. It will be observed that the tube has a central bore 63, as shown in Fig. 7. When this testing tube is to be inserted, the valve block 51 is rotated until the openings 50ᵇ and 51ᵇ are into registry, whereupon the tube is lowered until its lower end reaches the lower wall of the bucket 10. Thereupon, a sample of milk is taken and raised upwardly and withdrawn from the cabinet for inspection purposes.

The cabinet should preferably be of material such as sheet metal which may be adequately cleaned after each use. In some installations, however, it may be adequate to have the interior surfaces of the walls 1, 1ᵃ and 1ᶜ lined with a suitable metal such as copper or stainless steel with its lowest point sloped toward the discharge port 19.

In the operation of the apparatus described in the foregoing, sub-atmospheric pressure is established in the cabinet by means of suction through the pipe 5 from the suction pump indicated. Milk is drawn into the cabinet through the pipes 2ᵃ, 3ᵃ and 4ᵃ. It enters the distributing trough 14 and then passes downwardly over the cooling tubes 16 to the respective buckets 10. The milk received through the intake valves 2ᶜ, 3ᶜ and 4ᶜ is kept separate and the maintenance of such separation is made possible by partitions 70 which divide the upper portion of the cabinet. These partitions are positioned substantially vertically and extend from the upper portion of the cabinet downwardly to the approximate level of the buckets 10. Each partition on the side adjacent a bucket is curved so as to funnel the milk into the bucket. At the ends of the cabinet, the inner end surface is likewise provided with an inwardly extending and curved baffle surface which tends to lead the milk passing from the cooler pipes into the bucket and thus prevent it from dropping off and perhaps missing the buckets.

It will be understood from the foregoing that this apparatus makes it possible to keep the milk from several cows separate. Cooling, weighing and testing can thus be performed in a closed cabinet separated from cow stable or cow milking parlor atmosphere. It will be further noted that the processing described in the foregoing thus uses a portable cabinet which can be operated at sub-atmospheric pressure, combined with apparatus providing for cooling, weighing and testing.

It will be understood that the interior of the cabinet may be provided with one or more lamp bulb sockets, after the manner of a modern refrigerator, whereby light may be adequate for inspection of the milk and the reading of the weighing scales through the windows 22. These lamps are not illustrated and neither is the electric light cord plug in socket which obviously is normally located on the exterior of the cabinet.

I claim:

1. A milk sampling machine comprising a portable cabinet capable of being sealed to withstand atmospheric pressure, said cabinet having an intake port located in the upper portion of said cabinet, a first set of pipe connections leading from a milking machine to said cabinet intake port whereby milk freshly drawn from the cow is conveyed to said cabinet, and a second set of pipe connections in fluid communication with the interior of said cabinet for establishing and maintaining said cabinet under a desired vacuum and providing for a vacuum in said first set of pipe connections, a milk cooling element within said cabinet, distributing means within said cabinet and in the upper portion thereof and operatively associated with said intake port and cooling element for distributing milk received through said intake port to said milk cooling element, a weighing scale mounted within said cabinet, a milk weighing bucket within said cabinet and suspended from said scale and positioned below said cooling element to receive the cooled milk, an outlet valve in the lower part of said bucket whereby milk may be released from the bucket to flow to the bottom of the interior of said cabinet, means located on the exterior of said cabinet and extending into the same and connected with said outlet valve for operating said valve from the exterior of said cabinet, and a discharge valve located in the lower portion of said cabinet for draining said cabinet.

2. A milk sampling machine comprising a portable cabinet capable of being sealed to withstand atmospheric pressure, said cabinet having an intake port located in the upper portion of said cabinet, a first set of pipe connections leading from a milking machine to said cabinet intake port whereby milk freshly drawn from the cow is conveyed to said cabinet, and a second set of pipe connections in fluid communication with the interior of said cabinet for establishing and maintaining said cabinet under a desired vacuum and providing for a vacuum in said first set of pipe connections, a weighing scale mounted within said cabinet, a milk weighing bucket within said cabinet and suspended from said scale, an outlet valve in the lower part of said bucket whereby milk may be released from the bucket to flow to the bottom of the interior of said cabinet, means located on the exterior of said cabinet and extending into the same and connected with said outlet valve for operating said valve from the exterior of said cabinet, and a discharge valve located in the lower portion of said cabinet for draining said cabinet.

3. A milk sampling machine comprising a portable cabinet capable of being sealed to withstand atmospheric pressure, said cabinet having an intake port located in the upper portion of said cabinet, a first set of pipe connections leading from a milking machine to said cabinet intake port whereby milk freshly drawn from the cow is conveyed to said cabinet, and a second set of pipe connections in fluid communication with the interior of said cabinet for establishing and maintaining said cabinet under a desired vacuum and providing for a vacuum in said first set of pipe connections, a weighing scale mounted within said cabinet, a milk weighing bucket within said cabinet and suspended from said scale, distributing means within said cabinet and in the upper portion thereof for distributing milk received through said intake port to said bucket, an outlet valve in the lower part of said bucket whereby milk may be released from the bucket to flow to the bottom of the interior of said cabinet, means located on the exterior of said cabinet and extending into the same and connected with said outlet valve for operating said valve from the exterior of said cabinet, and a discharge valve located in the lower portion of said cabinet for draining said cabinet.

4. A milk sampling machine comprising a portable cabinet capable of being sealed to withstand atmospheric pressure, said cabinet having an intake port located in the upper portion of said cabinet, a first set of pipe connections leading from a milking machine to said cabinet intake port whereby milk freshly drawn from the cow is conveyed to said cabinet, and a second set of pipe connections for establishing and maintaining said cabinet under a desired vacuum and providing for a vacuum in said first set of pipe connections, a milk cooling element within said cabinet, distributing means within said cabinet and in the upper portion thereof for distributing milk received through said intake port to said milk cooling element, a weighing scale mounted within said cabinet, a milk weighing bucket within said cabinet and suspended from said scale and positioned below said cooling element to receive the cooled milk, an outlet valve in the lower part of said bucket whereby milk may be released from the bucket to flow to the bottom of the interior of said cabinet, means operatively associated with said valve for operating said valve, and a discharge valve located in the lower portion of said cabinet for draining said cabinet.

5. A milk sampling machine comprising a portable cabinet capable of being sealed to withstand atmospheric pressure, said cabinet having an intake port located in the upper portion of said cabinet, a first set of pipe connections leading from a milking machine to said cabinet intake port whereby milk freshly drawn from the cow is conveyed to said cabinet, and a second set of pipe connections in fluid communication with the interior of said cabinet for establishing and maintaining said cabinet under a desired vacuum and providing for a vacuum in said first set of pipe connections, a weighing scale mounted within said cabinet, a milk weighing bucket within said cabinet in fluid communication with said intake port and suspended from said scale, an outlet valve in the lower part of said bucket whereby milk may be released from the bucket to flow to the bottom of the interior of said cabinet, means operatively associated with said valve for operating said valve, and a discharge valve located in the lower portion of said cabinet for draining said cabinet.

6. A milk sampling machine comprising a portable cabinet having a top wall capable of being sealed to withstand atmospheric pressure, said cabinet having an intake port located in the upper portion of said cabinet, a first set of pipe connections leading from a milking machine to said cabinet intake port whereby milk freshly drawn from the cow is conveyed to said cabinet, and a second set of pipe connections for establishing and maintaining said cabinet under a desired vacuum and providing for a vacuum in said first set of pipe connections, a milk cooling element within said cabinet, distributing means within said cabinet and in the upper portion thereof for distributing milk received through said intake port to said milk cooling element, a weighing scale mounted within said cabinet, a milk weighing bucket within said cabinet and suspended from said scale and positioned below said cooling element to receive the cooled milk, an outlet valve in the lower part of said bucket whereby milk may be released from the bucket to flow to the bottom of the interior of said cabinet, means operatively associated with said valve for operating said valve, in the top wall of said cabinet being provided with an inspection port over said bucket through which a milk sampling device may be projected downwardly to said bucket, an air tight closure for said port, and a discharge valve located in the lower portion of said cabinet for draining said cabinet.

7. A milk sampling machine comprising a portable cabinet having a top wall and capable of being sealed to withstand atmospheric pressure, said cabinet having an intake port located in the upper portion of said cabinet, a first set of pipe connections leading from a milking machine to said cabinet intake port whereby milk freshly drawn from the cow is conveyed to said cabinet, and a second set of pipe connections in fluid communication with the interior of said cabinet for establishing and maintaining said cabinet under a desired vacuum and providing for a vacuum in said first set of pipe connections, a weighing scale mounted within said cabinet, a milk weighing bucket within said cabinet in fluid communication with said intake port and suspended from said scale, an outlet valve in the lower part of said bucket whereby milk may be released from the bucket to flow to the bottom of the interior of said cabinet, means operatively associated with said valve for operating said valve, the top wall of said cabinet having an inspection port over said bucket through which a milk sampling device may be projected downwardly to said bucket, an air tight closure for said port, and a discharge valve located in the lower portion of said cabinet for draining said cabinet.

WILLIAM ROGER ROOP.

REFERENCES CITED

The following references are of record in the file of this patent:

UNITED STATES PATENTS

| Number | Name | Date |
| --- | --- | --- |
| 1,010,328 | Umrath | Nov. 28, 1911 |
| 1,242,873 | Schroder | Oct. 9, 1917 |
| 1,536,634 | Shippert et al. | May 5, 1925 |
| 1,546,437 | Daysh | July 21, 1925 |
| 1,603,429 | Uphaus et al. | Oct. 19, 1926 |
| 1,633,953 | Preston | June 28, 1927 |
| 1,861,898 | Raven-Rosen-Baum et al. | June 7, 1932 |
| 1,910,830 | Hapgood | May 23, 1933 |
| 2,021,951 | Corderoy | Nov. 19, 1935 |
| 2,102,267 | Hodsdon | Dec. 14, 1937 |
| 2,509,214 | Cordis | May 30, 1950 |